(12) United States Patent
Wilhelmsson et al.

(10) Patent No.: US 9,178,738 B2
(45) Date of Patent: Nov. 3, 2015

(54) CHANNEL ESTIMATION IN OFDM RECEIVER EQUIPMENT

(75) Inventors: Leif Wilhelmsson, Dalby (SE); Jim Svensson, Lund (SE)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 1053 days.

(21) Appl. No.: 12/707,702

(22) Filed: Feb. 18, 2010

(65) Prior Publication Data

US 2011/0103497 A1    May 5, 2011

Related U.S. Application Data

(60) Provisional application No. 61/257,618, filed on Nov. 3, 2009.

(51) Int. Cl.
*H03K 9/00* (2006.01)
*H04L 27/01* (2006.01)
(Continued)

(52) U.S. Cl.
CPC .......... *H04L 27/2647* (2013.01); *H04L 25/022* (2013.01); *H04L 25/0206* (2013.01); *H04L 25/03159* (2013.01)

(58) Field of Classification Search
CPC .. H04B 7/0691; H04B 7/0439; H04B 7/0626; H04B 7/0874; H04B 1/1081; H04B 7/0413; H04B 7/0632; H04B 7/0639; H04B 17/309; H04B 17/318; H04B 1/02; H04B 1/06; H04B 7/0452; H04B 7/0634; H04B 7/0617; H04W 52/325; H04W 72/02; H04W 72/048; H04W 72/082; H04L 25/0206; H04L 25/0212; H04L 25/0228; H04L 1/0017; H04L 2001/0092; H04L 2025/03414; H04L 2025/03808; H04L 2209/80; H04L 25/0222; H04L 27/2675; H04L 5/023; H04L 5/06; H04L 9/0875
USPC ............... 375/220, 219, 222, 240.26–240.28, 375/259, 260, 295, 299, 316, 346, 347, 348, 375/324, 325, 221, 227, 229–236, 375/240.26–240.29, 285, 284, 326, 338, 375/339, 340, 349, 350
See application file for complete search history.

(56) References Cited

U.S. PATENT DOCUMENTS 6,445,693 B1    9/2002    Sarraf et al.
7,173,972 B2    2/2007    Thomson et al.
(Continued)

FOREIGN PATENT DOCUMENTS

CN    1830161 A    9/2006
EP    1 608 118 A1    12/2005
(Continued)

OTHER PUBLICATIONS

PCT International Search Report, mailed Feb. 18, 2011, in connection with International Application No. PCT/EP2010/066517.
(Continued)

*Primary Examiner* — Linda Wong
(74) *Attorney, Agent, or Firm* — Leffler Intellectual Property Law, PLLC; Kenneth B. Leffler

(57) ABSTRACT

A receiver is operated so as to receive data conveyed on an Orthogonal Frequency Division Multiplexed (OFDM) signal transmitted on a plurality of sub-carriers. Such operation includes ascertaining which of the plurality of sub-carriers have a channel quality that satisfies one or more criteria. Then, sub-carriers are selected based at least in part on whether they have the channel quality that satisfies one or more criteria. The receiver then fully processes data streams only from the selected sub-carriers, wherein fully processing data streams comprises sub-carrier channel estimation or sub-carrier equalization or both sub-carrier channel estimation and sub-carrier equalization.

21 Claims, 4 Drawing Sheets

(51) Int. Cl.
  *H04L 27/26* (2006.01)
  *H04L 25/02* (2006.01)
  *H04L 25/03* (2006.01)

(56) References Cited

U.S. PATENT DOCUMENTS

| | | | |
|---|---|---|---|
| 7,359,311 B1 | 4/2008 | Paranjpe et al. | |
| 7,366,088 B2 | 4/2008 | Bolinth et al. | |
| 7,498,935 B2* | 3/2009 | Kodama et al. | 340/538 |
| 2002/0052201 A1 | 5/2002 | Wilhelmsson et al. | |
| 2003/0231582 A1 | 12/2003 | Logvinov et al. | |
| 2008/0075190 A1* | 3/2008 | Lin | 375/267 |
| 2008/0130771 A1* | 6/2008 | Fechtel et al. | 375/260 |
| 2008/0181323 A1* | 7/2008 | Waters et al. | 375/260 |
| 2008/0298524 A1* | 12/2008 | Koorapaty et al. | 375/348 |
| 2008/0317147 A1 | 12/2008 | Zhang et al. | |
| 2009/0190535 A1* | 7/2009 | Hassan et al. | 370/329 |
| 2009/0238250 A1* | 9/2009 | Kangas et al. | 375/219 |
| 2009/0238297 A1* | 9/2009 | Zhang et al. | 375/267 |
| 2009/0323848 A1* | 12/2009 | Guthy et al. | 375/267 |
| 2010/0104041 A1* | 4/2010 | Ibi et al. | 375/285 |
| 2010/0197272 A1* | 8/2010 | Karaoguz et al. | 455/411 |
| 2011/0075752 A1* | 3/2011 | Zheng et al. | 375/267 |
| 2011/0149792 A1* | 6/2011 | Nakano et al. | 370/252 |
| 2013/0322340 A1* | 12/2013 | Nishio et al. | 370/328 |

FOREIGN PATENT DOCUMENTS

| | | |
|---|---|---|
| GB | 2 346 520 A | 8/2000 |
| JP | 2006 148220 A | 6/2006 |

OTHER PUBLICATIONS

PCT Written Opinion, mailed Feb. 18, 2011, in connection with International Application No. PCT/EP2010/066517.

Held, I. et al. "Receiver architecture and performance of WLAN/cellular multi-mode and multi-standard mobile terminals", IEEE 60th Vehicular Technology Conference 2004, vol. 3, Jan. 1, 2004, pp. 2248-2253, XP002592701, NJ, USA, ISBN: 978-0-7803-8521-4.

International Preliminary Report on Patentability, mailed Sep. 28, 2011, in connection with International Application No. PCT/EP2010/066517.

Chinese Second Office Action, dated Nov. 14, 2014, in connection with Chinese Patent Application No. 201080050484.0, all pages (see translation below).

Translation of Second Chinese Office Action, dated Nov. 14, 2014, in connection with Chinese Patent Application No. 201080050484.0, all pages.

Chinese Supplementary Search Report, dated Oct. 28, 2014, in connection with Chinese Patent Application No. 201080050484.0, all pages (see translation below).

Translation of Chinese Supplementary Search Report, dated Oct. 28, 2014, in connection with Chinese Patent Application No. 201080050484.0, all pages.

* cited by examiner

CHANNEL ESTIMATION IN OFDM RECEIVER EQUIPMENT

CROSS REFERENCE TO RELATED APPLICATIONS

This application claims the benefit of U.S. Provisional Application No. 61/257,618, filed Nov. 3, 2009, which is hereby incorporated herein by reference in its entirety.

BACKGROUND

The present invention relates to wireless communication systems that utilize Orthogonal Frequency Division Multiplexing (OFDM), and more particularly to methods and apparatuses for processing sub-carriers in a receiver in an OFDM communication system.

Examples of systems utilizing OFDM are those configured in accordance with wireless local area network (WLAN) standards IEEE 802.11a or 802.11g as well as those configured in accordance with any of a number of standards for broadcasting information, such as those for Digital Video Broadcasting (e.g., DVB-T, DVB-H, T-DMB), and for Digital Audio Broadcasting (DAB). OFDM is also the chosen access technique for the long term evolution in the Third Generation Partnership Project (3GPP) (3GPP-LTE).

In an OFDM system, data is transmitted in parallel on a large number of orthogonal sub-carriers. Efficient implementations of OFDM transmitters employ an inverse fast Fourier transform (IFFT) to generate the signal to be transmitted from parallel data streams. The parallel data streams are supplied as inputs to the IFFT, and the signal to be transmitted is supplied at the output.

OFDM technology is efficiently implemented in the receiver by employing a fast Fourier transform (FFT) to process the parallel data streams (one data stream per sub-carrier) from the received signal. Typical sizes of the FFT range from 64 (for instance for WLAN) to 8192 (for instance for DVB-T). If the size of the FFT is N, then the N samples at the output of the FFT are collectively referred to as an OFDM symbol. The number of sub-carriers used for data transmission is typically between 0.5N and N, where N is the FFT size.

One of the major reasons for using OFDM is that the channel estimation and equalization in the receiver can be performed by algorithms/circuitry whose level of complexity is much lower than that which would be required if a single carrier transmission were to be employed. Notwithstanding this generally lower level of complexity, the channel estimation and equalization are among some of the most computationally intensive blocks in an OFDM receiver. This is because the channel is essentially estimated for each one of the sub-carriers and its effect equalized on a sub-carrier by sub-carrier basis.

It is therefore desirable to provide methods and apparatuses for more efficient OFDM signal reception.

SUMMARY

It should be emphasized that the terms "comprises" and "comprising", when used in this specification, are taken to specify the presence of stated features, integers, steps or components; but the use of these terms does not preclude the presence or addition of one or more other features, integers, steps, components or groups thereof.

In accordance with one aspect of the present invention, the foregoing and other objects are achieved in methods and apparatuses (e.g., an apparatus in a user equipment) for operating a receiver to receive data conveyed on an Orthogonal Frequency Division Multiplexed (OFDM) signal transmitted on a plurality of sub-carriers. Such operation includes ascertaining which of the plurality of sub-carriers have a channel quality that satisfies one or more criteria. The receiver is operated to select sub-carriers at least in part on whether they have the channel quality that satisfies one or more criteria, and to fully process data streams only from the selected sub-carriers, wherein fully processing data streams comprises sub-carrier channel estimation or sub-carrier equalization or both sub-carrier channel estimation and sub-carrier equalization.

In some embodiments, operating the receiver to select sub-carriers at least in part on whether they have the channel quality that satisfies one or more criteria comprises operating the receiver to select only those sub-carriers having the channel quality that satisfies the one or more criteria.

In some embodiments, ascertaining which of the plurality of sub-carriers have a channel quality that satisfies one or more criteria comprises, for each of the plurality of sub-carriers, ascertaining a measure of sub-carrier quality and comparing the measure of sub-carrier quality with a threshold quality level. In some of these embodiments, the threshold quality level is set as a function of a predetermined target level of processing savings.

In some embodiments, operating the receiver to select sub-carriers at least in part on whether they have the channel quality that satisfies one or more criteria comprises storing a list of selected sub-carriers; and fully processing data streams only from the selected sub-carriers comprises retrieving at least a portion of the stored list and using the retrieved at least a portion of the stored list to at least in part control which of the plurality of sub-carriers data streams will be fully processed.

In some embodiments, operating the receiver to select sub-carriers at least in part on whether they have the channel quality that satisfies one or more criteria comprises storing a list of those sub-carriers that do not have a channel quality that satisfies the one or more criteria; and fully processing data streams only from the selected sub-carriers comprises operating the receiver to retrieve at least a portion of the stored list and using the retrieved at least a portion of the stored list to at least in part control which of the plurality of sub-carriers data streams will be fully processed.

In some embodiments, the one or more criteria are set based on a predetermined level of reduction in computational complexity, processing time, or energy, or a combination thereof. In some alternative embodiments, the one or more criteria are set such that a level of receiver performance will not fall below a predetermined level of performance degradation.

In some embodiments, the receiver comprises a data stream processing resource; and receiver operation includes operating the data stream processing resource to receive a data stream transmitted in accordance with a first radio communication standard, and concurrently operating the data stream processing resource to receive a data stream transmitted in accordance with a second radio communication standard.

In some embodiments, operating the receiver to select sub-carriers at least in part on whether they have the channel quality that satisfies one or more criteria comprises generating a bit mask comprising a plurality of bits, each of which indicates whether a respective one or a respective set of the plurality of sub-carriers is selected or not selected; and fully processing data streams only from the selected sub-carriers comprises using the bit mask to selectively enable or disable full data stream processing from a respective one or a respective set of the sub-carriers.

BRIEF DESCRIPTION OF THE DRAWINGS

The objects and advantages of the invention will be understood by reading the following detailed description in conjunction with the drawings in which.

DETAILED DESCRIPTION

Figure 1:
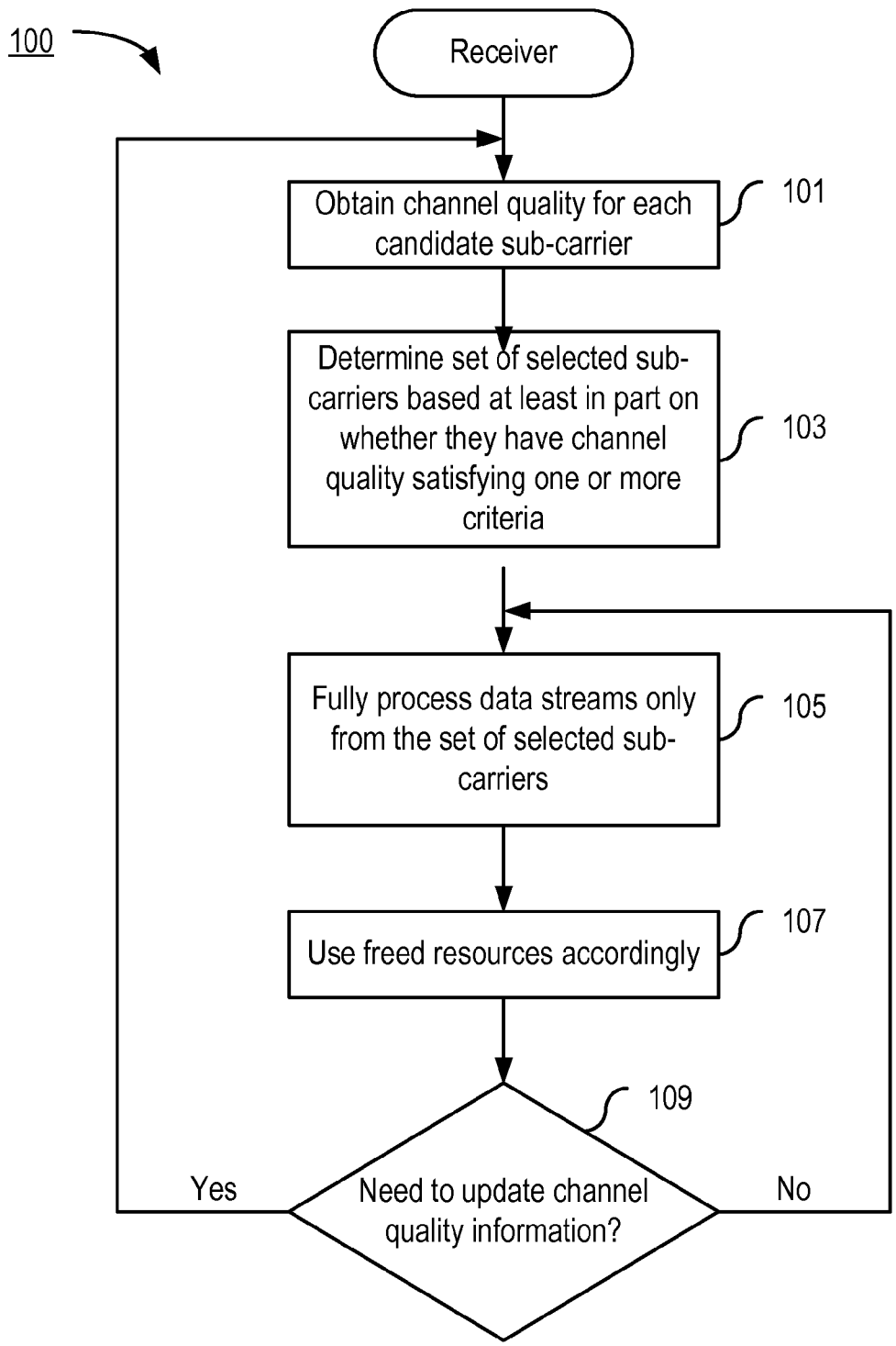
FIG. 1 is, in one respect, a flow chart of steps/processes/functions, carried out by an exemplary receiver consistent with the embodiments of the invention to instill in a receiver an efficient OFDM reception capability.

The various features of the invention will now be described with reference to the figures, in which like parts are identified with the same reference characters.

The various aspects of the invention will now be described in greater detail in connection with a number of exemplary embodiments. To facilitate an understanding of the invention, many aspects of the invention are described in terms of sequences of actions to be performed by elements of a computer system or other hardware capable of executing programmed instructions. It will be recognized that in each of the embodiments, the various actions could be performed by specialized circuits (e.g., analog and/or discrete logic gates interconnected to perform a function as described herein; and/or one or more Application Specific Integrated Circuits designed to conform with a functional specification as described herein), by one or more processors programmed with (i.e., combined with) a suitable set of instructions, or by a combination of both. The term "circuitry configured to" perform one or more described actions is used herein to refer to any such embodiment (i.e., one or more specialized circuits and/or one or more programmed processors) because such embodiments ultimately include some sort of circuitry. Moreover, the invention can additionally be considered to be embodied entirely within any form of computer readable carrier, such as solid-state memory, magnetic disk, or optical disk containing an appropriate set of computer instructions that would cause a processor to carry out the techniques described herein. Thus, the various aspects of the invention may be embodied in many different forms, and all such forms are contemplated to be within the scope of the invention. For each of the various aspects of the invention, any such form of embodiments as described above may be referred to herein as "logic configured to" perform a described action, or alternatively as "logic that" performs a described action.

As mentioned in the Background section, it is desirable to provide methods and apparatuses for a more efficient OFDM receiver implementation. In this regard, the inventors have recognized that, in theory, it is possible in an OFDM system to choose to transmit data on any arbitrary set of available sub-carriers, without any requirement that the sub-carriers form a contiguous part of the frequency spectrum. Such operation would allow a transmitter to use only those sub-carriers experiencing good channel conditions between the transmitter and receiver. Such an arrangement, however, assumes that channel knowledge is available at the transmitter side so that an informed selection of sub-carriers can be made. The amount of extra overhead needed to provide this channel knowledge to the transmitter can be large, making such embodiments difficult to benefit from. Consequently, in practice, the OFDM transmitters typically transmit data over good as well as bad sub-carriers. For example, one application in which all sub-carriers are used regardless of sub-carrier quality is broadcast, where there typically is no feedback available. This is for instance the case for DVB-T and DVB-H. To compensate for the fact that the level of performance under these circumstances is essentially determined by the total quality of the channel, proper error correction coding and interleaving are used.

The inventors have recognized that, because the computational efforts of channel estimation and equalization do not depend on the quality of the channel, a significant part of the computational work expended on processing poor-quality sub-carriers (e.g., generating channel estimates and equalizing the poor-quality sub-carriers) adds very little improvement to the quality of receiver performance. This means that significant time and power are used to only marginally improve the receiver performance. Moreover, the time it takes to complete channel estimation and equalization becomes longer than necessary because part of the processed sub-carriers are essentially worthless in the decoding of the data. The reduced operating time for battery powered devices and the longer processing time under these circumstances therefore constitute wasted resources within the receiver.

To address these and/or other issues, an aspect of embodiments consistent with the invention involves fully processing only those sub-carrier data streams that are transmitted on the parts of the bandwidth where the channel conditions are most favorable, and ignoring/discarding the other data streams in order to reduce the computational complexity of the receiver processing and/or to reduce the power consumption. As used herein, the term "fully processing" refers to at least one or both of per-carrier channel estimation and per-carrier equalization. The idea is to discard data streams and inhibit those streams' related processing (e.g., channel estimation and/or equalization) early in the receiver processing chain, thereby achieving efficiencies in the receiver by fully processing data streams from only those sub-carriers whose channel quality satisfies one or more criteria.

FIG. 1 is, in one respect, a flow chart of steps/processes/functions, carried out by an exemplary receiver consistent with the invention to provide efficient OFDM reception capability. The receiver may be implemented in a User Equipment (UE). In another respect, FIG. 1 can be considered to depict the various elements of circuitry 100 configured to carry out the various functions described in FIG. 1 and its supporting text. Those of ordinary skill in the art will readily be able to configure various embodiments of such circuitry (e.g., one or more programmed processors, Application Specific Integrated Circuits, hard-wired digital logic circuitry) based on the functional descriptions presented herein.

Reception of an OFDM signal transmitted on a plurality of sub-carriers comprises obtaining a measure of channel quality for each of the sub-carriers (step 101). At this stage, each of the sub-carriers is a candidate for selection in later processing.

The receiver then determines a set of selected sub-carriers from the candidate sub-carriers, wherein the set of selected sub-carriers consists of those candidate sub-carriers whose channel quality satisfies one or more criteria (step 103). For example, in this exemplary embodiment, selection can be based on whether a measured channel quality is as good as or better than a threshold quality level. In an aspect of some but not necessarily all embodiments, the threshold quality level can itself be selected as a function of how much of a reduction in computational complexity it is desired to achieve, or alternatively, on how much performance degradation is acceptable.

In some embodiments, the duration of computational complexity reduction/performance degradation can vary, depending on circumstances that are determined dynamically. For example, if the reduction is needed to free up resources to make them available to another system, the duration can be as long as the other system is active, which could be on the order of minutes or even hours. It could also be the case that the reduction is only needed when the other system is receiving but not when it is transmitting. In this case, the reduction might be turned on and off periodically, for example, every five milliseconds.

The selection results can be stored in any number of ways, such as in an ordered list (e.g., with ordering based on level of measured channel quality). In some alternative embodiments, a binary mask can be stored, with each bit in the mask corresponding to a respective one of the sub-carriers or to a respective set of sub-carriers. An example of such a set would be one in which the sub-carriers are clustered in groups of fours. This implies that, on the one hand, the granularity of selection would be reduced, but on the other hand the size of the list would be reduced by a factor of four. In such embodiments, selection involves setting each bit to a value that indicates whether that sub-carrier or set of subcarriers is selected.

Having produced a set of selected sub-carriers, the receiver then operates its circuitry to fully process data streams from only the set of selected sub-carriers (step 105). It will be recognized that receiver resources (e.g., battery power, processing power, etc.) are conserved by not operating receiver circuitry to fully process data streams from all of the candidate sub-carriers. These freed receiver resources can then be used to achieve various advantages within the receiver (step 107), as will be further described below.

The channel quality measurements upon which sub-carrier selection was based will likely change over time. Therefore, the exemplary embodiment further includes ascertaining whether channel quality information about all of the sub-carriers should be re-evaluated (i.e., updated) (decision block 109). If so ("YES" path out of decision block 109), then processing reverts back to step 101 so that this can be performed. Otherwise ("NO" path out of decision block 109), processing loops back to step 105 to continue processing data from those data streams that had been previously selected.

In order to facilitate a better understanding of aspects and merits of various embodiments of the invention, this description makes reference to specific embodiments. However, this is not intended to limit the scope of the invention in any way. As will be appreciated by anyone of ordinary skill in the art, the various principles illustrated herein can be extended in various ways.

Suppose that communication equipment conforming to the LTE standard is used for communication, and that the channel bandwidth is 20 MHz. This means that data is transmitted on 1200 sub-carriers, spaced 15 kHz apart from one another, so that the most energy is located within 18 MHz, leaving roughly 1 MHz of guard band on each side of the occupied bandwidth.

The data to be transmitted is conventionally coded by an error correcting code and interleaved in time and frequency in order to gain from the time and frequency diversity of the channel. Assuming that the channel is not known at the transmitter side, no means for using only sub-carriers with good channel conditions are available for the transmitter, with the result being that data transmitted on the sub-carriers that experience poor channel conditions are received with low reliability. However, since the data is coded and spread over a large bandwidth, the major part of the coded data will experience good channel conditions and this is typically enough to enable the user data to be recovered even if some of the coded data are received with low reliability.

Figure 2:
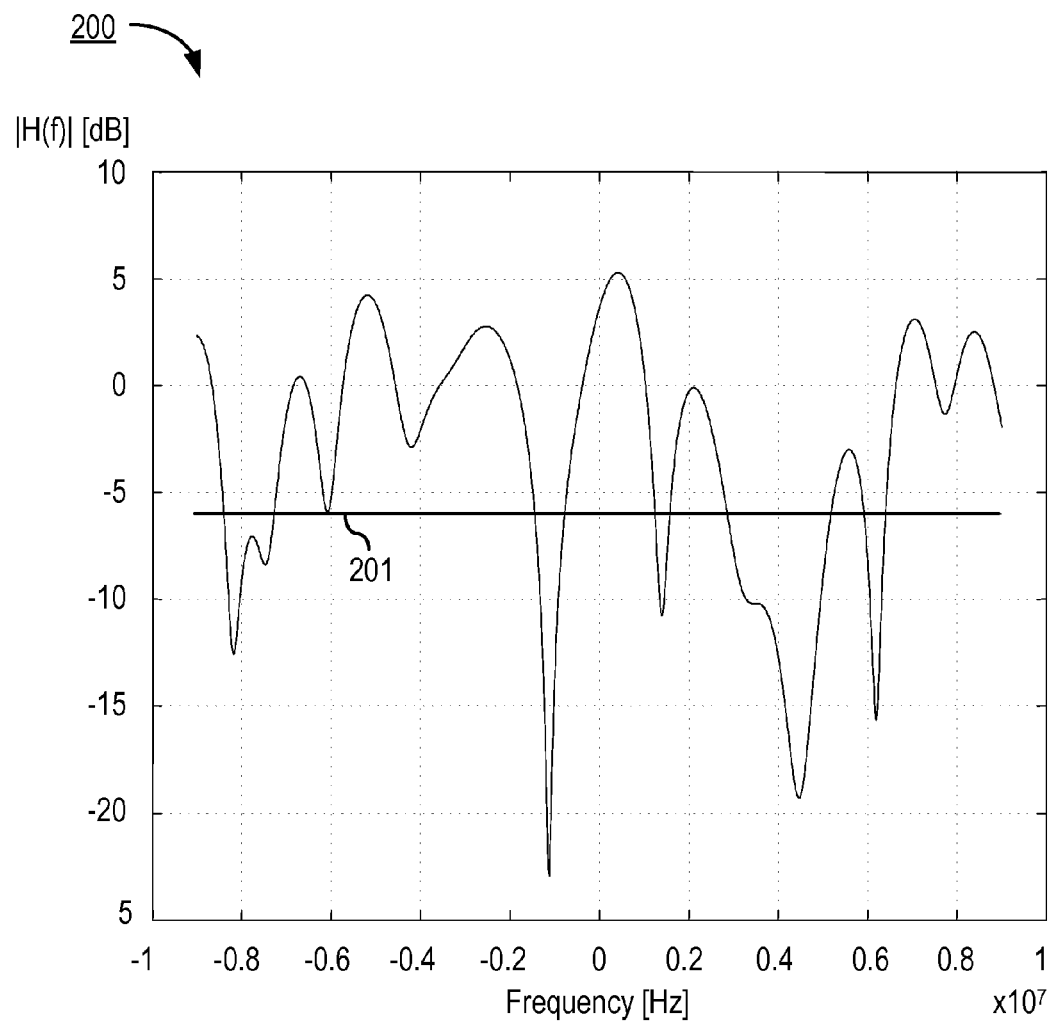
FIG. 2. is a graph showing an exemplary amplitude function of a channel for which the excess delay is 1 μs, and the distribution of the channel taps are uniform.

FIG. 2. is a graph 200 showing an amplitude function of a channel for which the excess delay is 1 µs, and the distribution of the channel taps are uniform. As can be seen, there is a 25 dB difference in the amplitude function, indicating that the difference in signal-to-noise-ratio (SNR) experienced for the best and the worst sub-carriers will be 25 dB.

Consider the horizontal line 201 at −6 dB. The number of sub-carriers below this level is about 20%, but clearly the received power that these sub-carriers will contribute with will be very small. In a conventional implementation, all of the sub-carriers will be fully processed in that the channel will be estimated, the received symbols will be equalized, soft-bit information will be generated, and then the decoding will be performed. The poor reliability of the bits corresponding to data sent over poor sub-carriers is taken into account in the decoding algorithm, but contributes less to the performance than the more reliable bits. However, this also means that a sub-carrier with poor reliability uses as much computational resources as a more reliable sub-carrier.

Figure 3:
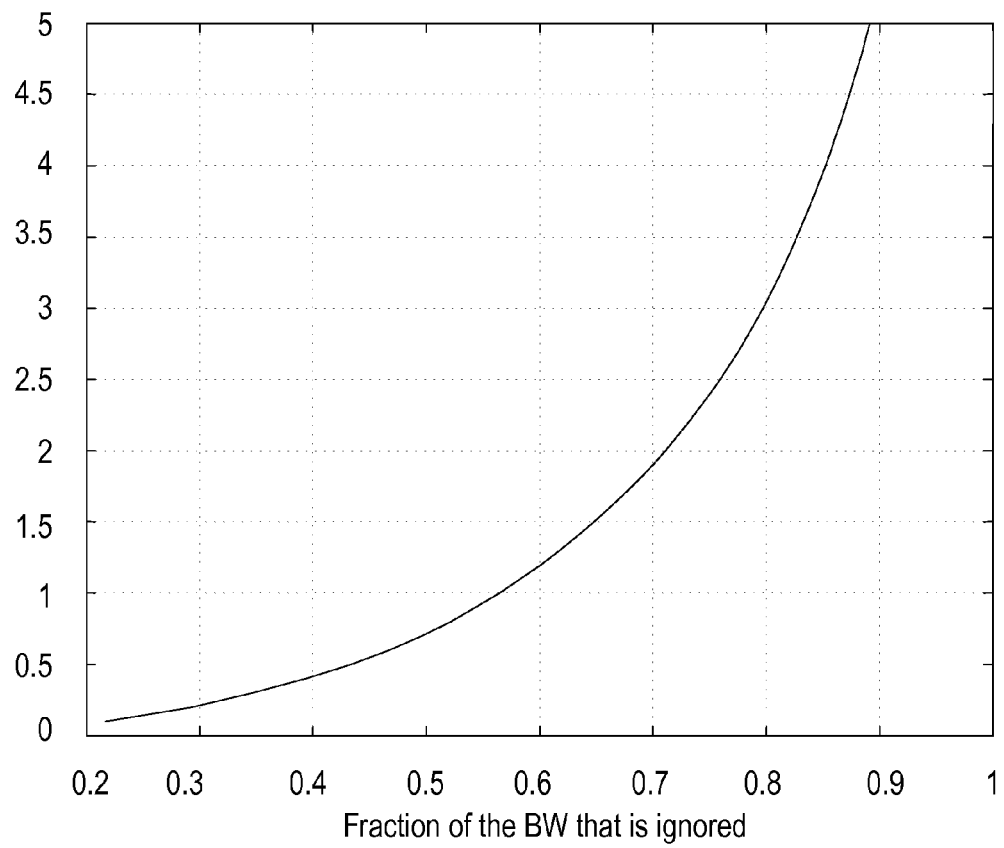
FIG. 3 is a graph showing the performance loss as a function of how large a fraction of the total number of available sub-carriers is discarded, wherein the discarded sub-carriers are the ones with lowest channel quality.

Analyzing the situation in more detail, one can determine how much of the totally received energy would be lost if the sub-carriers experiencing the worst channel conditions were discarded completely rather than being first processed and then given a very low weight in the decoding process. FIG. 3 is a graph 300 showing, for an exemplary channel, the performance loss as a function of how large a fraction of the total number of available sub-carriers is discarded, wherein the discarded sub-carriers are the ones with lowest channel quality. For example, if 30% of those sub-carriers experiencing the worst channel are discarded, the corresponding loss is only 0.2 dB. If the worst 50% of the sub-carriers are discarded, a loss of about 0.75 dB results. This indicates that a substantial complexity reduction can be achieved at the cost of only a very limited performance loss.

In practice, receiver circuitry determines which of the sub-carriers should be discarded in order to ensure that the ones experiencing good channel conditions are included in the full data stream processing process. (See, e.g., steps 101 and 103 of FIG. 1.) This means determining the channel quality of each of the different sub-carriers and, for instance, creating an ordered list starting with the index associated with the sub-carrier having the best channel conditions (e.g., highest Signal-to-Noise Ratio—"SNR") and ending with the index of the sub-carrier having the worst channel conditions (e.g., lowest SNR). Then, based on this list the sub-carriers can be discarded in a several different ways. For example, the number of sub-carriers can be determined based on (i.e., as a function of) computational resources. The amount of computation resources that should be used might vary quickly if the resources are shared with another user application, or the amount could be essentially fixed for an entire session of one application, such as when the reduction is based on a need to reduce power consumption. If there is a need to reduce the computations by a predetermined target level of processing savings, say for this example 30%, then 30% of the sub-carriers are discarded. In alternative embodiments, the number of sub-carriers discarded is based on how much degradation is acceptable. In some embodiments, this allowable degradation is identified in the receiver by measuring a metric in the demodulation or decoding. If, for instance, the application is a broadcast service, different receivers would typically experience very different signal quality, and some receivers may have a large margin before errors begin to occur. If 0.75 dB of degradation is acceptable, then the least reliable 50% of the sub-carriers can be discarded. In practice, the channel quality needs to be estimated. This can for instance be done by using the estimated amplitude function directly, but it can also be done using some simplified rule that is known in the art. For instance, if at one moment it is determined that a certain set of sub-carriers is poor, one way of performing an update is to start with this set and consider those sub-carriers that are at the boundary between good and poor. Specifically, if sub-carriers numbered . . . , k−3, k−2, k−1 are poor, whereas sub-carriers numbered k, k+1, k+2, . . . are good for OFDM symbol n, then the set of good sub-carriers can be updated by considering, for example, the two sub-carriers closest to the boundary on each side (i.e., sub-carriers k−2, k−1 on one side, and sub-carriers k and k+1 on the other). In this way, the update would be considerably less complex than if all sub-carriers were to be considered while performing the update.

In another embodiment, no list is used to indicate which of the sub-carriers to discard. Instead, finding which sub-carriers to discard is done by comparing the channel quality of each sub-carrier with a threshold (e.g., the −6 dB threshold shown in FIG. 2). A mask containing one of two possible values (e.g., using a binary "1") for the sub-carriers with a channel quality above this threshold and zeros for the sub-carriers below this threshold is then created and used when determining what sub-carriers to discard. The mask can then be used in any number of ways, depending upon implementation details. For example, in programmed processor embodiments, each bit can be tested and a conditional branch taken that either performs full data processing or skips full data processing depending on the outcome of the branch. Alternatively, in hardwired embodiments, the mask can be used to generate a set of signals that alternatively enable or disable processing by other data processing circuitry.

In yet another embodiment, instead of using an ordered list of sub-carrier indices or even a mask based on channel quality, a somewhat arbitrary set of sub-carriers are discarded in order to reduce the amount of needed computations. Because adjacent sub-carriers experience similar channel properties the complexity can be reduced by 50% by, for instance, using only every other sub-carrier. In this case the performance would also degrade by 50%, which corresponds to 3 dB. It will be appreciated that such embodiments essentially have no need to perform step 101 of FIG. 1, and perform a step similar to step 105 but not dependent on channel quality.

In yet another alternative, it is possible to adopt sub-carrier selection strategies that combine the several approaches described above by selecting sub-carriers whose data streams will not be fully processed based on whether their channel quality is poor, and then supplements this set of selected sub-carriers by further selecting one or more additional sub-carriers, wherein this further selection is made on some other basis, including random selection. In such embodiments, it can be said that the receiver is operated to select sub-carriers at least in part on whether they have the channel quality that satisfies one or more criteria.

Relating to another aspect, it was described earlier how the resources freed by not having to fully process data streams from all candidate sub-carriers can be used to improve receiver performance. (See, e.g., step 107 of FIG. 1.) In some embodiments, this includes reducing the time required to determine whether the received data packet was correctly decoded or not. This might for instance be desirable when an acknowledge (ACK) message, or negative acknowledge (NACK) message needs to be provided to the transmitter as a return response.

In yet another embodiment, a set of sub-carriers is discarded in order to allow the processing of the remaining sub-carriers to take place at a slower pace. By allowing processing to be done at a slower pace, energy can be saved because the clock rate for the processing block can be lowered and/or the voltage can be reduced.

In yet another embodiment the computational resources for full data processing (e.g., computational resources for channel estimation and equalization) are potentially shared between two different communication systems. If channel estimation and equalization are only needed for one system, then all sub-carriers are processed, but if the resources need to be shared, then at least one of the systems is discarding some of the sub-carriers to free up computational resources that can then be used by the other system.

In still another embodiment, the thus freed computational resources that are not used for full processing of data from one or more sub-carriers (e.g., channel estimation and equalization resources) may be used for audio- or video-processing and the like, instead of being used for data processing of another standard/system.

As mentioned earlier, since the channel properties are changing with time, the ordered list must be updated occasionally to reflect the actual channel conditions. (See, e.g., decision block 109 of FIG. 1.) In some embodiments, this is achieved by updating the ordered list on a regular basis, such as by performing channel estimation on all sub-carriers once every 10 OFDM symbols and then updating the set of sub-carriers that should be discarded accordingly.

In alternative embodiments, the update is made at a rate that depends on how fast the channel is expected to vary, for instance by invoking knowledge of the Doppler spread of the channel. In yet other alternative embodiments, the update is made based on the channel quality obtained from selected sub-carriers.

Figure 4:
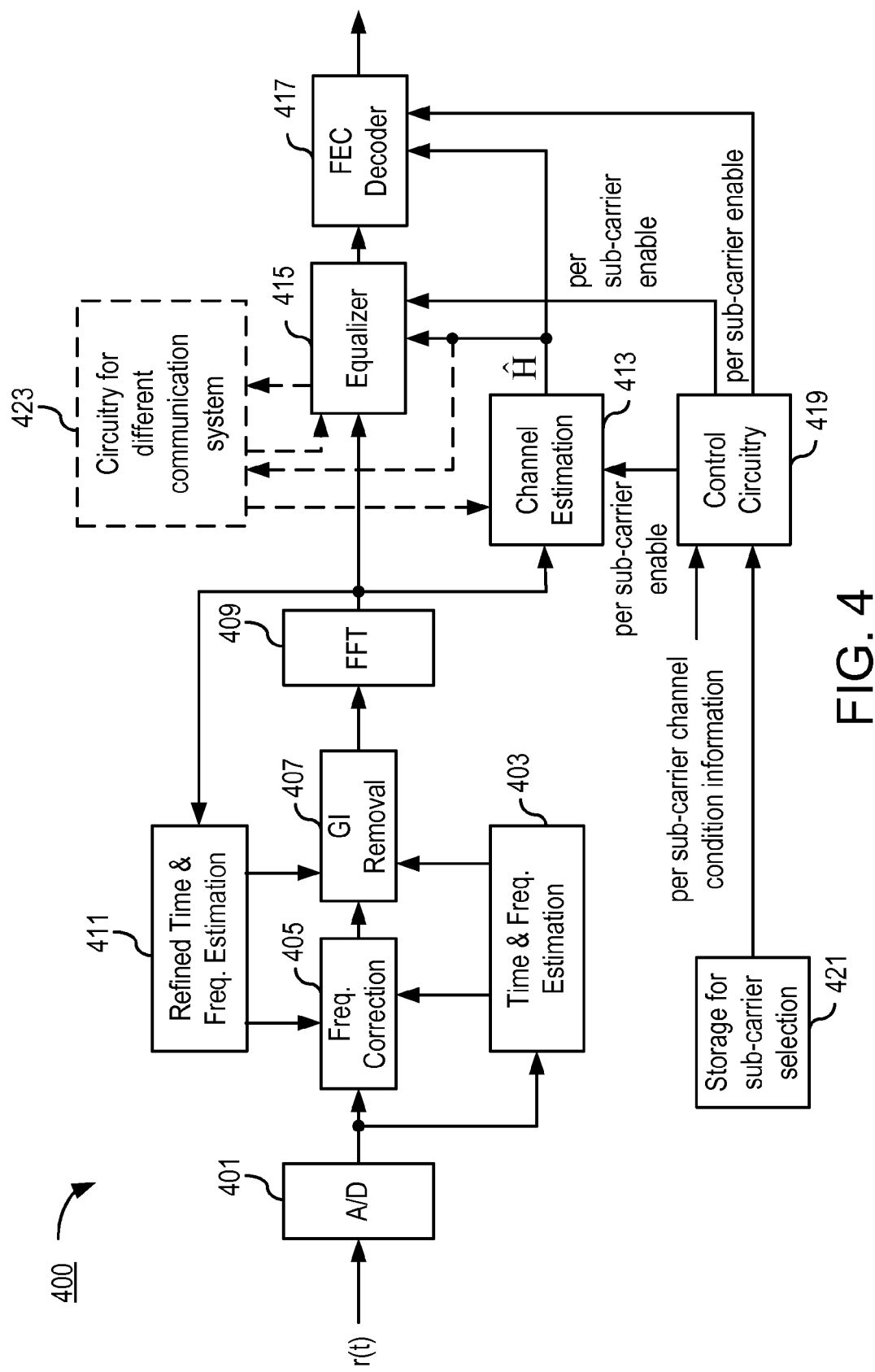
FIG. 4 is a block diagram of an exemplary OFDM receiver 400 consistent with aspects of the invention.

FIG. 4 is a block diagram of an exemplary OFDM receiver 400 consistent with aspects of the invention. The receiver can, for example, be circuitry within a communication network node, or user equipment within a communication system. An analog signal, r(t), generated by receiving and downconverting a radiofrequency signal, is supplied to an analog-to-digital (A/D) converter 401. The digitized signal, r(k), is then supplied to a frequency correction unit 405 and a coarse timing and frequency estimation unit 403, which generates a coarse estimate of the timing and frequency offset of the received signal, wherein the frequency offset is the difference between the frequency of the transmitted signal and the frequency of the received signal. This information is supplied to the frequency correction unit 405 as well as a Guard Interval (GI) removal unit 407. It is well-known that OFDM systems make use of a GI to provide a level of immunity against large delay spreads. The GI (also referred to in the literature as a "cyclic prefix", or "CP") is a copy of the last part of an OFDM symbol that is sent before the actual symbol. Therefore, the GI part of a received OFDM symbol can be removed prior to demodulation.

The GI removal unit 407 also receives the output of the frequency correction unit 405. Based on the timing information available, the GI removal unit 407 removes the GI and supplies the remaining part of the received OFDM symbol to an FFT unit 409, whose output is supplied to the remainder of the receiver, including a refined timing and frequency estimation unit 411, which is able to generate more accurate timing and frequency information from the FFT output signal. The more accurate frequency information is fed back to the frequency correction unit 405 to improve the receiver's performance. The more accurate timing information is similarly fed back to the GI removal unit 407 to improve the receiver's performance.

The exemplary receiver 400 further includes circuitry configured to carry out one or more of the various functions described above with reference to FIGS. 1-3. In this exemplary embodiment, this includes a channel estimation unit 413, an equalizer 415 and an FEC decoder 417 which are used to fully process data from data streams supplied at a plurality of outputs of the FFT unit 409. Channel estimation, equalization and FEC decoding are known in the art and need not be described here in further detail.

The exemplary embodiment further includes control circuitry 419 (e.g., hardwired logic gates and/or programmed processor circuitry designed in accordance with known design techniques to implement the functionality described herein) configured to operate remaining receiver circuitry in accordance with one or more aspects of the invention as described herein, such as in FIG. 1 and supporting text. The control circuitry 419 is coupled to a storage unit 421 for sub-carrier selection. The storage unit 421 can, for example, store an ordered list of sub-carriers as described earlier. Alternatively, the storage unit 421 can store a bit mask as described earlier.

In the exemplary embodiment, the control circuitry 419 generates one or more control signals that control the channel estimation unit 413, the equalizer 415 and the FEC decoder 417 to selectively enable or disable these respective units' processing on a sub-carrier by sub-carrier basis. Processing that is inhibited for any given sub-carrier constitutes a resource savings within the receiver 400 that can be used for any of a number of purposes, such as but not limited to those described above.

When the control circuitry 419 is configured to carry out embodiments such as those illustrated in FIG. 1, the control circuitry 419 ascertains which of the plurality of sub-carriers has a channel quality that satisfies one or more critera, and then operates circuitry within the receiver 400 to select sub-carriers at least in part on whether the sub-carriers have the channel quality that satisfies the one or more criteria. To facilitate this functionality, the control circuitry 419 receives per sub-carrier channel condition information. The per sub-carrier channel condition information can be generated based on a presently received signal. Alternatively, the per sub-carrier channel condition information can be previously stored information (i.e., information generated based on a previously received signal). In such embodiments, it is further a possibility to update the stored per sub-carrier channel condition information based on presently determined channel conditions. The updated information is then used when the functionality is repeated for a next signal.

To illustrate just one of many possible purposes, it was mentioned earlier that in some embodiments the computational resources for full data processing (e.g., data stream processing resources for channel estimation and equalization) are potentially shared between two different communication systems. If channel estimation and equalization are only needed for one system, then all sub-carriers are processed, but if the resources need to be shared, then at least one of the systems is discarding some of the sub-carriers to free up computational resources that can then be used by the other system. This embodiment is illustrated in FIG. 4 by the provision of circuitry for a different communication system 423 (shown in dotted lines to show that it is not present in all embodiments). The circuitry for the different communication system 423 supplies suitable signals to respective inputs of the channel estimation unit 413 and the equalizer 415. Output signals from the channel estimation unit 413 and the equalizer 415 are then supplied to respective inputs of the circuitry for a different communication system 423 which utilizes them in a suitable way to achieve data communication in accordance with requirements of that other communication system. The details of such other utilization are beyond the scope of the present invention and would be readily apparent to any person of ordinary skill in the art who is designing circuitry for that different communication system.

The invention has been described with reference to particular embodiments. However, it will be readily apparent to those skilled in the art that it is possible to embody the invention in specific forms other than those of the embodiment described above.

For example, the above-described embodiments adopt an approach in which a "selected" sub-carrier is one for which it is desired to fully process a data stream. However, one could equivalently practice embodiments that adopt an approach in which a "selected" sub-carrier is one for which full data stream processing will be inhibited (i.e., full processing occurs only for those sub-carriers that are not "selected"—For example, FIG. 1's block 105 in these alternative embodiments would read "inhibit full data stream processing from the set of selected sub-carriers"). It will be appreciated that here, selection can be based on, for example, measured channel quality not reaching some minimum threshold level.

In other alternatives, the basic idea of only processing those sub-carriers experiencing good channel conditions is applied to receiver environments that support receiver diversity. In such embodiments, the idea is applied to the different diversity branches and is used to determine which sub-carriers are worth processing for each one of the diversity branches.

In still other embodiments, the basic idea of only processing the sub-carriers that experience good channel conditions is applied to embodiments in which multiple-input multiple-output (MIMO) technology is used.

Thus, the described embodiments are merely illustrative and should not be considered restrictive in any way. The scope of the invention is given by the appended claims, rather than the preceding description, and all variations and equivalents which fall within the range of the claims are intended to be embraced therein.

What is claimed is:

1. A method of operating a receiver to receive data conveyed on an Orthogonal Frequency Division Multiplexed (OFDM) signal transmitted on a plurality of sub-carriers, wherein each of the sub-carriers conveys a respective data stream, the method comprising:

using one or more criteria to ascertain a reduced set of sub-carriers from the plurality of sub-carriers by not including one or more of the sub-carriers that do not have a channel quality that is sufficiently good such that full data stream processing will be performed;

not performing channel estimation on the data streams from sub-carriers that are not included within the reduced set of sub-carriers and not performing equalization on the data streams from sub-carriers that are not included within the reduced set of sub-carriers; and performing at least one of sub-carrier channel estimation only on the data streams from the reduced set of sub-carriers and sub-carrier equalization only on the data streams from the reduced set of sub-carriers.

2. The method of claim 1, wherein using one or more criteria to ascertain the reduced set of sub-carriers from the plurality of sub-carriers by not including one or more of the sub-carriers that do not have a channel quality that is sufficiently good such that full data stream processing will be performed comprises:
  for each of the plurality of sub-carriers, ascertaining a measure of sub-carrier quality and comparing the measure of sub-carrier quality with a threshold quality level.

3. The method of claim 2, comprising:
  setting the threshold quality level as a function of a predetermined target level of processing savings that can be attained by not fully processing the data stream on the sub-carrier.

4. The method of claim 1, wherein:
  using one or more criteria to ascertain the reduced set of sub-carriers from the plurality of sub-carriers by not including one or more of the sub-carriers that do not have a channel quality that is sufficiently good such that full data stream processing will be performed comprises storing a list of the reduced set of sub-carriers; and
  performing at least one of sub-carrier channel estimation only on the data streams from the reduced set of sub-carriers and sub-carrier equalization only on the data streams from the reduced set of sub-carriers comprises retrieving at least a portion of the stored list and using the retrieved at least a portion of the stored list to at least in part control which of the plurality of sub-carriers data streams will be subjected to at least one of sub-carrier channel estimation and sub-carrier equalization.

5. The method of claim 1, wherein:
  using one or more criteria to ascertain the reduced set of sub-carriers from the plurality of sub-carriers by not including one or more of the sub-carriers that do not have a channel quality that is sufficiently good such that full data stream processing will be performed comprises storing a list of those sub-carriers that are not sufficiently good such that full data stream processing will be performed; and
  performing at least one of sub-carrier channel estimation only on the data streams from the reduced set of sub-carriers and sub-carrier equalization only on the data streams from the reduced set of sub-carriers comprises operating the receiver to retrieve at least a portion of the stored list and using the retrieved at least a portion of the stored list to at least in part control which of the plurality of sub-carriers data streams will be subjected to at least one of sub-carrier channel estimation and sub-carrier equalization.

6. The method of claim 1, comprising:
  setting the one or more criteria based on a predetermined level of computational complexity reduction.

7. The method of claim 1, comprising:
  setting the one or more criteria such that a level of receiver performance will not fall below a predetermined level of performance degradation.

8. The method of claim 1, wherein:
  the receiver comprises a data stream processing resource; and
  the method comprises operating the data stream processing resource to receive a data stream transmitted in accordance with a first radiocommunication standard, and concurrently operating the data stream processing resource to receive a data stream transmitted in accordance with a second radiocommunication standard.

9. The method of claim 1, wherein:
  using one or more criteria to ascertain the reduced set of sub-carriers from the plurality of sub-carriers by not including one or more of the sub-carriers that do not have a channel quality that is sufficiently good such that full data stream processing will be performed comprises generating a bit mask comprising a plurality of bits, each of which indicates whether a respective one or a respective set of the plurality of sub-carriers is included or not included; and
  performing at least one of sub-carrier channel estimation only on the data streams from the reduced set of sub-carriers and sub-carrier equalization only on the data streams from the reduced set of sub-carriers comprises using the bit mask to selectively enable or disable at least one of sub-carrier channel estimation and sub-carrier equalization from a respective one or a respective set of the sub-carriers.

10. The method of claim 1, wherein one or more of the criteria represent sub-carriers having a more favorable set of channel conditions compared to channel conditions of other sub-carriers.

11. An apparatus for operating a receiver to receive data conveyed on an Orthogonal Frequency Division Multiplexed (OFDM) signal transmitted on a plurality of sub-carriers, wherein each of the sub-carriers conveys a respective data stream, the apparatus comprising:
  circuitry configured to use one or more criteria to ascertain a reduced set of sub-carriers from the plurality of sub-carriers by not including one or more of the sub-carriers that do not have a channel quality that is sufficiently good such that full data stream processing will be performed; and
  circuitry configured to perform at least one of sub-carrier channel estimation only on the data streams from the reduced set of sub-carriers and sub-carrier equalization only on the data streams from the reduced set of sub-carriers,
  wherein the apparatus is configured to not perform channel estimation on the data streams from sub-carriers that are not included within the reduced set of sub-carriers and to not perform equalization on the data streams from sub-carriers that are not included within the reduced set of sub-carriers.

12. The apparatus of claim 11, wherein the circuitry configured to use one or more criteria to ascertain the reduced set of sub-carriers from the plurality of sub-carriers by not including one or more of the sub-carriers that do not have a channel quality that is sufficiently good such that full data stream processing will be performed comprises:
  circuitry configured to ascertain, for each of the plurality of sub-carriers, a measure of sub-carrier quality and to compare the measure of sub-carrier quality with a threshold quality level.

13. The apparatus of claim 12, comprising:
  circuitry configured to set the threshold quality level as a function of a predetermined target level of processing savings that can be attained by not fully processing the data stream on the sub-carrier.

14. The apparatus of claim 11, wherein:
  the circuitry configured to use one or more criteria to ascertain the reduced set of sub-carriers from the plurality of sub-carriers by not including one or more of the sub-carriers that do not have a channel quality that is sufficiently good such that full data stream processing will be performed comprises circuitry configured to store a list of the reduced set of sub-carriers; and the circuitry configured to perform at least one of sub-carrier channel estimation only on the data streams from the reduced set of sub-carriers and sub-carrier equalization only on the data streams from the reduced set of sub-carriers comprises circuitry configured to retrieve at least a portion of the stored list and to use the retrieved at least a portion of the stored list to at least in part control which of the plurality of sub-carriers data streams will be subjected to at least one of sub-carrier channel estimation and sub-carrier equalization.

15. The apparatus of claim 11, wherein:
the circuitry configured to use one or more criteria to ascertain the reduced set of sub-carriers from the plurality of sub-carriers by not including one or more of the sub-carriers that do not have a channel quality that is sufficiently good such that full data stream processing will be performed comprises circuitry configured to store a list of those sub-carriers that are not sufficiently good such that full data stream processing will be performed; and
the circuitry configured to perform at least one of sub-carrier channel estimation only on the data streams from the reduced set of sub-carriers and sub-carrier equalization only on the data streams from the reduced set of sub-carriers comprises circuitry configured to operate the receiver to retrieve at least a portion of the stored list and to use the retrieved at least a portion of the stored list to at least in part control which of the plurality of sub-carriers data streams will be subjected to at least one of sub-carrier channel estimation and sub-carrier equalization.

16. The apparatus of claim 11, comprising:
circuitry configured to set the one or more criteria based on a predetermined level of computational complexity reduction.

17. The apparatus of claim 11, comprising:
circuitry configured to set the one or more criteria such that a level of receiver performance will not fall below a predetermined level of performance degradation.

18. The apparatus of claim 11, comprising:
a data stream processing resource; and
circuitry configured to operate the data stream processing resource to receive a data stream transmitted in accordance with a first radiocommunication standard, and to concurrently operate the data stream processing resource to receive a data stream transmitted in accordance with a second radiocommunication standard.

19. The apparatus of claim 11, wherein:
the circuitry configured to use one or more criteria to ascertain the reduced set of sub-carriers from the plurality of sub-carriers by not including one or more of the sub-carriers that do not have a channel quality that is sufficiently good such that full data stream processing will be performed comprises circuitry configured to generate a bit mask comprising a plurality of bits, each of which indicates whether a respective one or a respective set of the plurality of sub-carriers is included or not included; and
the circuitry configured to perform at least one of sub-carrier channel estimation only on the data streams from the reduced set of sub-carriers and sub-carrier equalization only on the data streams from the reduced set of sub-carriers comprises circuitry configured to use the bit mask to selectively enable or disable at least one of sub-carrier channel estimation and sub-carrier equalization from a respective one or a respective set of the sub-carriers.

20. The apparatus of claim 11, wherein the apparatus is configured to operate as part of a user equipment.

21. The apparatus of claim 11, wherein one or more of the criteria represent sub-carriers having a more favorable set of channel conditions compared to channel conditions of other sub-carriers.

* * * * *